US011873735B1

(12) United States Patent
Boyer et al.

(10) Patent No.: US 11,873,735 B1
(45) Date of Patent: Jan. 16, 2024

(54) COMPOSITE COMPONENT FOR A GAS TURBINE ENGINE

(71) Applicant: General Electric Company, Schenectady, NY (US)

(72) Inventors: Mitchell Harold Boyer, Cincinnati, OH (US); Christopher Timothy Roll, West Chester, OH (US); Kristin Lynn Bolte Baxter, Mason, OH (US); Joseph Saeler, Batavia, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/984,545

(22) Filed: Nov. 10, 2022

(51) Int. Cl.
*F01D 5/28* (2006.01)
*F01D 5/30* (2006.01)

(52) U.S. Cl.
CPC ............... *F01D 5/282* (2013.01); *F01D 5/30* (2013.01); *F05D 2300/6034* (2013.01)

(58) Field of Classification Search
CPC ... F01D 5/282; F01D 5/34; F01D 5/30; F05D 2300/6034
See application file for complete search history.

(56) References Cited

U.S. PATENT DOCUMENTS

| | | | | |
|---|---|---|---|---|
| 6,003,564 | A | 12/1999 | Cahuzac et al. | |
| 6,676,373 | B2 | 1/2004 | Marlin et al. | |
| 7,101,154 | B2 * | 9/2006 | Dambrine | B29C 70/48 442/205 |
| 7,241,112 | B2 | 7/2007 | Dambrine et al. | |
| 8,499,450 | B2 * | 8/2013 | Naik | B29B 11/16 29/889.71 |
| 8,505,588 | B2 | 8/2013 | Coupe et al. | |
| 8,607,454 | B2 | 12/2013 | Blanchard et al. | |
| 8,696,319 | B2 | 4/2014 | Naik | |
| 9,033,673 | B2 | 5/2015 | Roussille et al. | |
| 9,062,562 | B2 | 6/2015 | Coupe et al. | |
| 9,080,454 | B2 | 7/2015 | Coupe et al. | |
| 9,555,592 | B2 * | 1/2017 | Illand | F01D 5/30 |
| 10,280,537 | B2 * | 5/2019 | Marchal | B29C 70/24 |
| 10,519,576 | B2 | 12/2019 | Marchal et al. | |
| 10,697,302 | B2 | 6/2020 | Taylor et al. | |
| 11,415,008 | B2 * | 8/2022 | Backhouse | F01D 9/041 |
| 11,473,223 | B2 * | 10/2022 | Oberste | D03C 13/02 |
| 2021/0095571 | A1 * | 4/2021 | Fernandez | F01D 11/16 |

* cited by examiner

*Primary Examiner* — Courtney D Heinle
*Assistant Examiner* — Danielle M. Christensen
(74) *Attorney, Agent, or Firm* — McGarry Bair PC

(57) ABSTRACT

A composite component for a gas turbine engine includes a body including a composite material. Furthermore, the composite component includes a connection feature integrally woven to the body. Additionally, the connection portion includes a composite material. Moreover, the composite material of the body and the composite material of the connection feature include alternating layers of fiber tows integrally woven together.

20 Claims, 11 Drawing Sheets

COMPOSITE COMPONENT FOR A GAS TURBINE ENGINE

FEDERALLY SPONSORED RESEARCH

This invention was made with United States Government support through the Air Force Research Laboratory (AFRL). The United States Government may have certain rights in the invention.

FIELD

The present disclosure relates to gas turbine engines and, more particularly, to a composite component for a gas turbine engine.

BACKGROUND

A gas turbine engine generally includes a compressor section, a combustion section, and a turbine section. More specifically, the compressor section progressively increases the pressure of air entering the gas turbine engine and supplies this compressed air to the combustion section. The compressed air and a fuel mix within the combustion section and burn within a combustion chamber to generate high-pressure and high-temperature combustion gases. The combustion gases flow through the turbine section before exiting the engine. In this respect, the turbine section converts energy from the combustion gases into rotational energy. This rotational energy is, in turn, used to rotate one or more shafts, which drive the compressor section and/or a fan assembly of the gas turbine engine.

In recent years, the use of composite materials within gas turbine engines has grown dramatically. For example, fan blades, rotor blades, stator vanes, and the like are being increasingly formed from composite materials to reduce the weight of and/or increase the operating temperature range of the engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
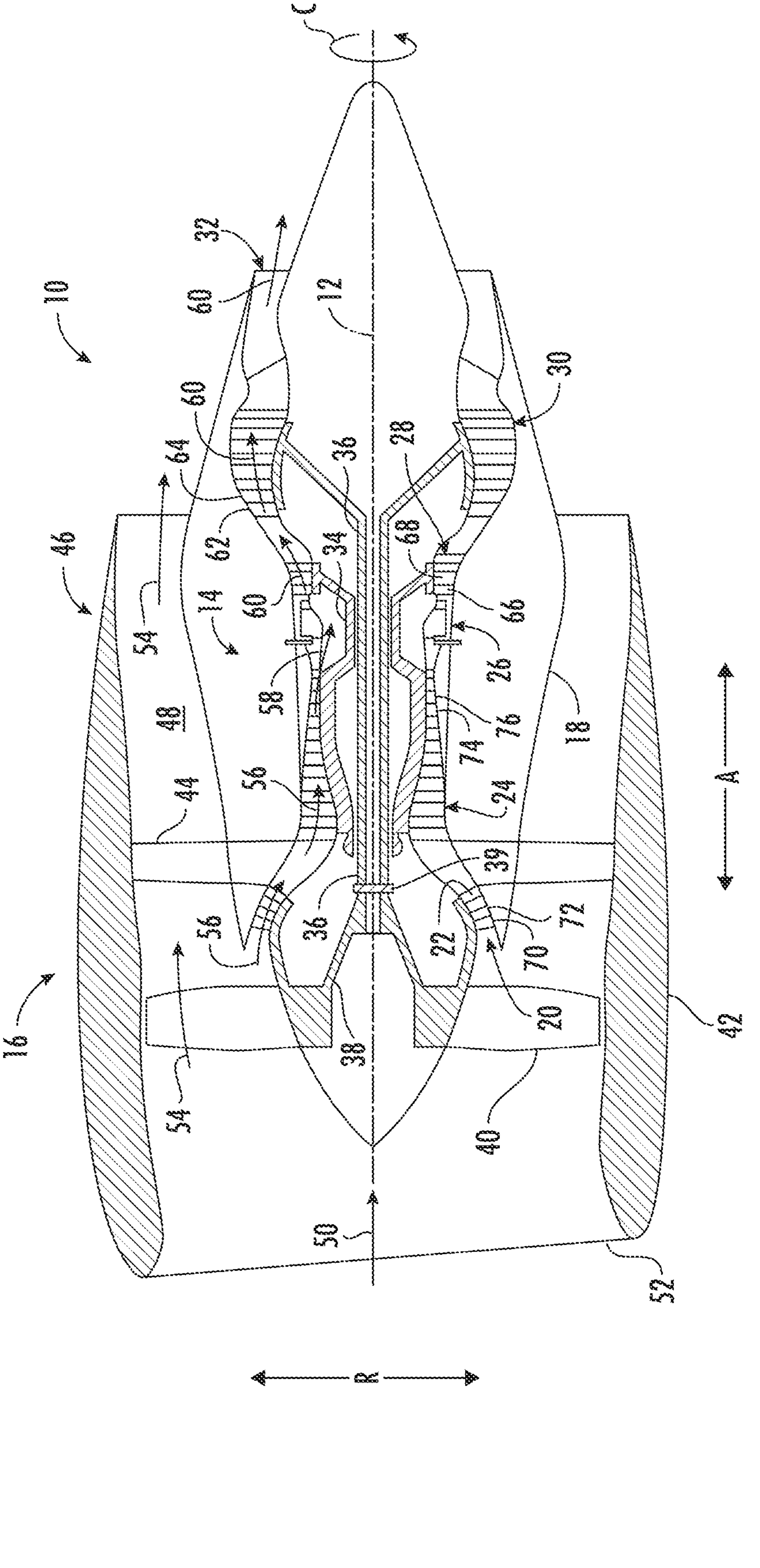
FIG. 1 illustrates a cross-sectional view of a gas turbine engine in accordance with one or more exemplary aspects of the present disclosure.
Figure 2A:
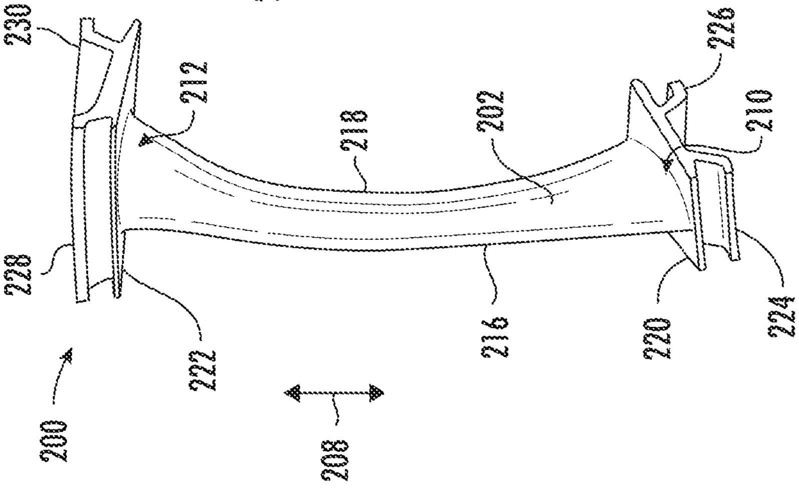
FIG. 2A illustrates a forward view of a stator vane for a gas turbine engine in accordance with one or more exemplary aspects of the present disclosure.
Figure 2B:
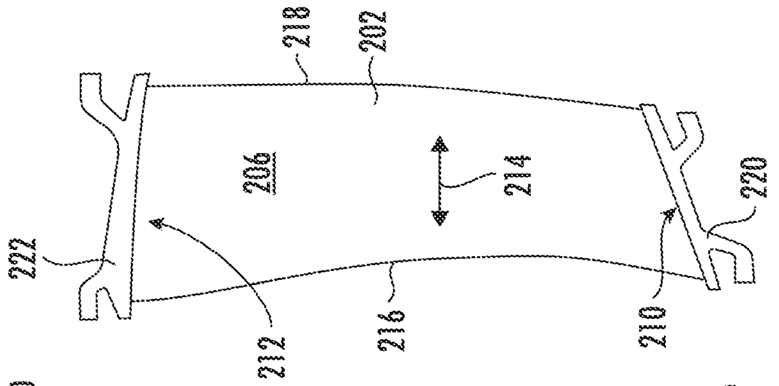
FIG. 2B illustrates a suction side view of the stator vane shown in FIG. 2A.
Figure 2C:
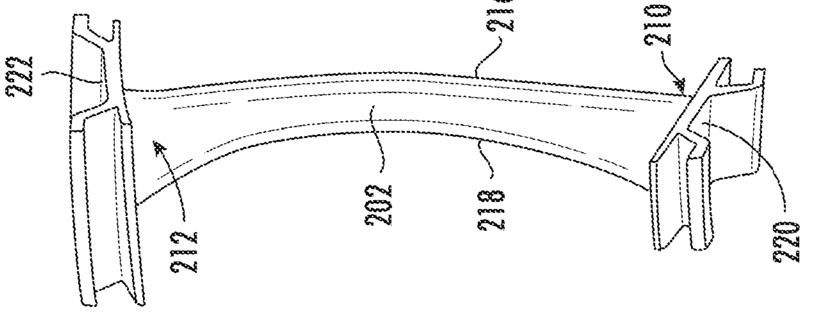
FIG. 2C illustrates an aft view of the stator vane shown in FIG. 2A.
Figure 2D:
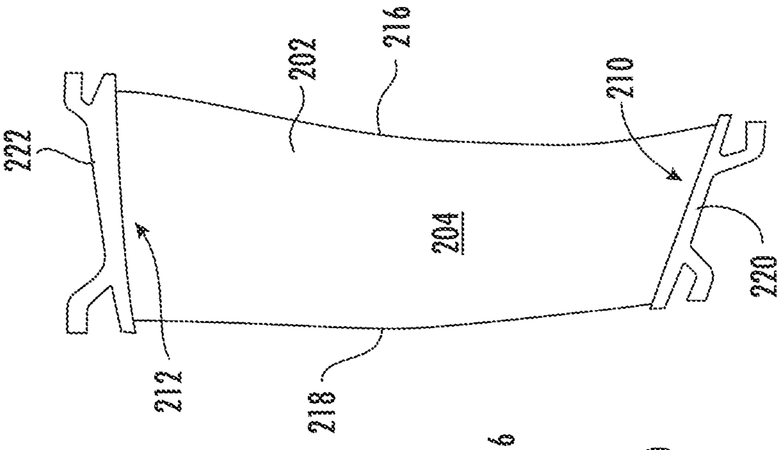
FIG. 2D illustrates a pressure side view of the stator vane shown in FIG. 2A.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source. Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereo.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

As such, the present disclosure is directed to a composite component for a gas turbine engine. Specifically, the composite component includes a body formed from a composite material. Furthermore, the composite component includes one or more connection features integrally woven to the body. The connection feature(s) is similarly formed from a composite material. In this respect, the composite material of the airfoil and the connection feature(s) are integrally woven together.

For example, in several embodiments, the composite component is a stator vane for a gas turbine engine. Specifically, the stator vane includes an airfoil formed from a composite material. Furthermore, the stator vane includes an inner band integrally woven to a root of the airfoil and/or an outer band integrally woven to a tip of the airfoil. The inner and/or outer bands are similarly formed from a composite material. In this respect, the composite material of the airfoil and the inner and/or the outer bands are integrally woven together to define a T-shape(s). Additionally, in several embodiments, the inner and/or outer bands include an integrally woven forward hook or an integrally woven aft hook. Such hook(s), in turn, is configured to couple the stator vane to the adjacent component(s) of the gas turbine engine (e.g., the inner shroud and/or outer casing). For example, in one embodiment, the integrally woven forward hook and/or the integrally woven aft hook are positioned axially inboard of the leading edge of the airfoil and axially inboard of the trailing edge of the airfoil.

Such integrally woven construction of the composite component improves the performance and manufacturing process of the composite component. More specifically, the integral weaving of the body and the connection feature(s) (e.g., airfoil with the inner and/or outer bands) reduces the weight of the composite component (e.g., the stator vane), thereby reducing overall engine weight and improving fuel economy. Furthermore, the connection between the body and the connection feature(s) is strengthened. For example, the integral weaving of the hook(s) with the inner and/or outer band strengthens the hook(s) and distributes stress away from the edges of the inner and/or outer bands, thereby improving engine service life. Additionally, because the composite component is formed from a single woven preform, the complex and time-consuming process of combining multiple preforms is not needed.

Referring now to the drawings, wherein identical numerals indicate the same elements throughout the figures, FIG. 1 is a schematic cross-sectional view of an exemplary high-bypass turbofan-type gas turbine engine 10 as may incorporate various embodiments disclosed herein. However, in alternative embodiments, the gas turbine engine 10 may be configured as any other suitable type of gas turbine engine.

As shown in FIG. 1, the gas turbine engine 10 defines a longitudinal or axial centerline 12 extending therethrough for reference. In this respect, the gas turbine engine 10 defines an axial direction A extending parallel to a longitudinal centerline 12, a radial direction R extending orthogonally outward from the longitudinal centerline 12, and a circumferential direction C extending circumferentially around the longitudinal centerline 12.

In general, the gas turbine engine 10 may include a core turbine 14 disposed downstream from a fan section 16. The core turbine 14 may generally include a substantially tubular outer casing 18 that defines an annular inlet 20. The outer casing 18 may be formed from a single casing or multiple casings. The outer casing 18 encloses, in serial flow relationship, a compressor section having a booster or low-pressure compressor 22 ("LP compressor 22") and a high-pressure compressor 24 ("HP compressor 24"), a combustion section 26, a turbine section having a high-pressure turbine 28 ("HP turbine 28") and a low-pressure turbine 30 ("LP turbine 30"), and an exhaust section 32. A high-pressure shaft or spool 34 ("HP shaft 34") drivingly couples the HP turbine 28 and the HP compressor 24. A low-pressure shaft or spool 36 ("LP shaft 36") drivingly couples the LP turbine 30 and the LP compressor 22. The LP shaft 36 may also couple to a fan spool or shaft 38 of the fan section 16. In some embodiments, the LP shaft 36 may couple directly to the fan shaft 38 (i.e., a direct-drive configuration). In other configurations, such as the illustrated embodiment, the LP shaft 36 may couple to the fan shaft 38 via a reduction gear 39 (i.e., an indirect-drive or geared-drive configuration).

In several embodiments, the fan section 16 includes a plurality of fan blades 40 coupled to and extending radially outwardly from the fan shaft 38. An annular fan casing or nacelle 42 circumferentially encloses the fan section 16 and/or at least a portion of the core turbine 14. The nacelle 42 may be supported relative to the core turbine 14 by a plurality of circumferentially spaced apart outlet guide vanes 44. Furthermore, a downstream section 46 of the nacelle 42 may enclose an outer portion of the core turbine 14 to define a bypass airflow passage 48 therebetween.

As illustrated in FIG. 1, air 50 enters an inlet portion 52 of the gas turbine engine 10 during operation thereof. A first portion 54 of the air 50 flows into the bypass airflow passage 48, while a second portion 56 of the air 50 flows into the inlet 20 of the LP compressor 22. One or more sequential stages of LP compressor stator vanes 70 and LP compressor rotor blades 72 coupled to the LP shaft 36 progressively compress the second portion 56 of the air 50 flowing through the LP compressor 22 en route to the HP compressor 24. Next, one or more sequential stages of HP compressor stator vanes 74 and HP compressor rotor blades 76 coupled to the HP shaft 34 further compress the second portion 56 of the air 50 flowing through the HP compressor 24. This provides compressed air 58 to the combustion section 26 where it mixes with fuel and burns to provide combustion gases 60.

The combustion gases 60 flow through the HP turbine 28 where one or more sequential stages of HP turbine stator vanes 66 and HP turbine rotor blades 68 coupled to the HP shaft 34 extract a first portion of kinetic and/or thermal energy therefrom. This energy extraction supports operation of the HP compressor 24. The combustion gases 60 then flow through the LP turbine 30 where one or more sequential stages of LP turbine stator vanes 62 and LP turbine rotor blades 64 coupled to the LP shaft 36 extract a second portion of thermal and/or kinetic energy therefrom. This energy extraction causes the LP shaft 36 to rotate, thereby supporting operation of the LP compressor 22 and/or rotation of the fan shaft 38. The combustion gases 60 then exit the core turbine 14 through the exhaust section 32 thereof.

Along with the gas turbine engine 10, the core turbine 14 serves a similar purpose and sees a similar environment in land-based gas turbines and turbojet engines in which the ratio of the first portion 54 of the air 50 to the second portion 56 of the air 50 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP shaft 36 and the fan shaft 38 of the fan section 16.

The configuration of the gas turbine engine 10 described above and shown in FIG. 1 are provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Referring now to FIGS. 2A-2D, various views of one embodiment of a stator vane 200 are illustrated in accordance with one or more exemplary aspects of the present disclosure. As such, the stator vane 200 may be incorporated into the gas turbine engine 10 of FIG. 1 in place of any of the LP compressor stator vanes 70, the HP compressor stator vanes 74, the HP turbine stator vanes 66, and/or the LP turbine stator vanes 62. In alternative embodiments, the construction of the stator vane 200 that will be described below may be incorporated into the rotating the components of the gas turbine engine 10.

As shown, the stator vane 200 includes an airfoil 202. More specifically, the airfoil 202 includes a pressure side 204 and an opposing, suction side 206. Furthermore, the airfoil 202 extends in a spanwise direction 208 from a root 210 to a tip 212. Moreover, the airfoil extends in a chordwise direction 214 from a leading edge 216 and a trailing edge 218. The airfoil 202 is formed from a composite material.

In some embodiments, the stator vane 200 includes an inner band 220 and/or an outer band 222. Specifically, the inner band 220 is integrally woven to the root 210 of the airfoil 202 such that a T-shape is defined by the airfoil 202 and the inner band 220. Conversely, the outer band 222 is integrally woven to the tip 212 of the airfoil 202 such that a T-shape is defined by the airfoil 202 and the outer band 222. The inner and/or outer bands 220, 222 are formed from a composite material. In this respect, and as will be described below, the inner and/or outer bands 220, 222 are integrally woven with the airfoil 202. As such, in some embodiments, the stator vane 200 may be constructed using a single piece three dimensional woven preform.

As shown, the inner band 220 includes an integrally woven forward hook 224. For example, the integrally woven forward hook 224 may face forward relative to the axial direction A (FIG. 1). Furthermore, the integrally woven forward hook 224 may be positioned axially inboard of the leading edge 216 of the airfoil 202 and axially inboard of the trailing edge 218 of the airfoil 202, thereby positioned axially between the leading edge 216 and trailing edge 218. Additionally, in some embodiments, the inner band 220 includes an integrally woven aft hook 226. For example, the aft hook 226 may face rearward relative to the axial direction A. The integrally woven aft hook 226 may be positioned axially inboard of the leading edge 216 of the airfoil 202 and axially inboard of the trailing edge 218 of the airfoil 202, thereby positioned axially between the leading edge 216 and trailing edge 218. However, in alternative embodiments, the hooks 224, 226 may face in any other suitable direction.

Moreover, as shown, the outer band 222 includes an integrally woven forward hook 228. For example, the integrally woven forward hook 228 may face forward relative to the axial direction A. Furthermore, the integrally woven forward hook 228 may be positioned axially inboard of the leading edge 216 of the airfoil 202 and axially inboard of the trailing edge 218 of the airfoil 202, thereby positioned axially between the leading edge 216 and trailing edge 218. Additionally, in some embodiments, the outer band 222 includes an integrally woven aft hook 230. For example, the aft hook 230 may face rearward relative to the axial direction A. The integrally woven aft facing hook 230 may be positioned axially inboard of the leading edge 216 of the airfoil 202 and axially inboard of the trailing edge 218 of the airfoil 202, thereby positioned axially between the leading edge 216 and trailing edge 218. However, in alternative embodiments, the hooks 228, 230 may face in any other suitable direction.

Figure 3:
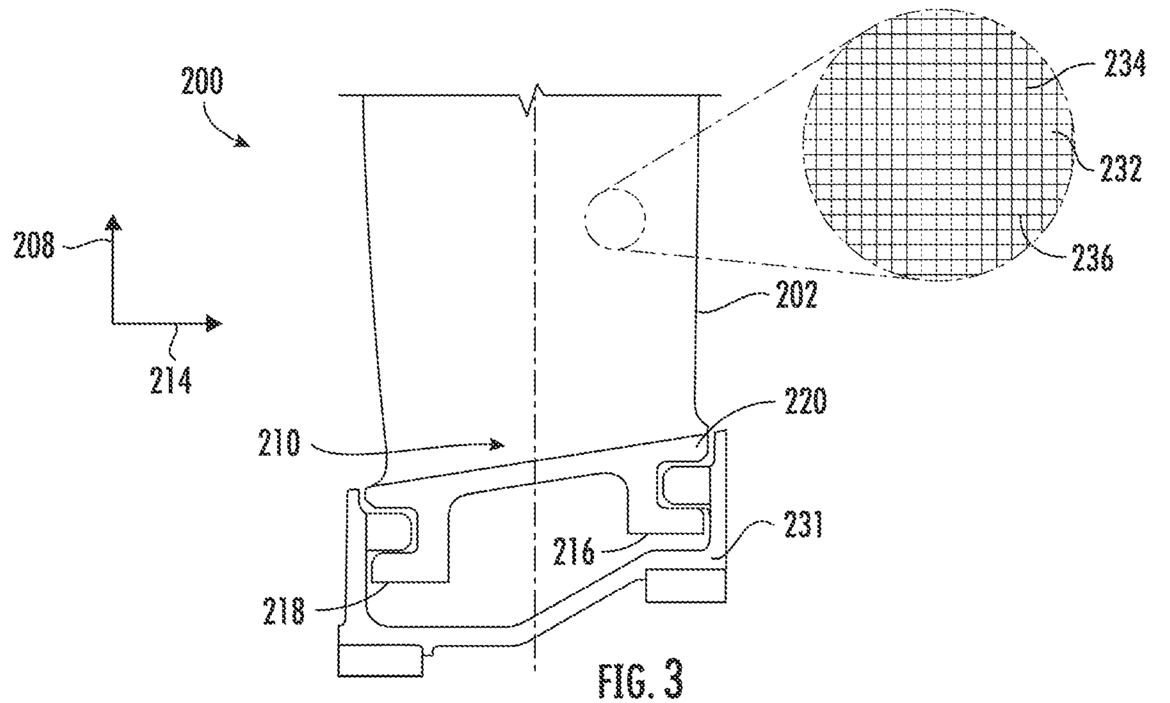
FIG. 3 illustrates a partial view of a stator vane for a gas turbine engine in accordance with one or more exemplary aspects of the present disclosure, particularly illustrating the stator vane coupled to an inner shroud of the gas turbine engine.

In general, the hooks 224, 226, 228, 230 are configured to secure the stator vane 200 to the adjacent components of the gas turbine engine 10 (FIG. 1). Thus, the hooks 224, 226, 228, 230 allow the stator vane 200 to be restrained into place within the gas turbine engine 10. For example, as shown in FIG. 3, the hooks 224, 226 on the inner band 220 interface with and couple to an inner band 231 of the gas turbine 10 (FIG. 1). Similarly, the hooks 228, 230 on the outer band 222 (FIGS. 2A-2D) interface with and couple to an outer casing (not shown) of the gas turbine engine 10. As such, the positioning of the hooks 224, 226, 228, 230 axially inboard of the leading and trailing edges 216, 218 of the airfoil 202 reduces the axial length of the stator vane 200 and, thus, may reduce overall engine length. Additionally, hooks 224, 226, 228, 230 allow for a variety of vane attachment patterns, thereby reducing the complexity of the manufacturing process of the stator vane 200.

As mentioned above, the stator vane 200 is formed from a composite material 232. As shown in FIG. 3, the composite material 232 includes a plurality of interwoven fibers. Specifically, in several embodiments, the composite material 232 includes a plurality of warp fibers 234 running in the spanwise direction 208 and a plurality of weft fibers 236 running in the chordwise direction 214. In general, when forming the composite material 232, the warp fibers 234 are held stationary in tension, while the weft fibers 236 are drawn through and inserted over and under the warp fibers 234. The warp fibers 234 and the weft fibers 236 may have any suitable spatial configuration and variation based on the shape, location, structural requirements, or other design considerations of the stator vane 200. For example, the spacing between the warp fibers 234, the weft fibers 236, or a combination thereof may be consistent across a given portion of the stator vane 200. The composite material 232 may include a variety of materials such as, but not limited to, carbon fibers, glass fibers, or combinations thereof.

Additionally, as mentioned above, the airfoil 202 and the inner and outer bands 220, 222 are integrally formed. More specifically, the warp fibers 234 from the airfoil 202 are folded over and integrated with the warp fibers of the inner and/or outer bands 220, 222. The warp fibers 234 of the inner and/or outer bands 220, 222, in turn, run in the circumferential direction C. The warp fibers 234 of the airfoil 202 travel through the thickness of the inner and/or outer bands 220, 222 to form a strong integration. Thus, the T-shape(s) defined between the airfoil 202 and the inner and/or outer bands 220, 222 creates vane-to-vane and vane-to-case interfaces that are simpler than those currently in the art, thereby reducing leakages and removing weight from the gas turbine engine 10 (FIG. 1). Moreover, such T-shape(s) eliminates the need for more complex machined features in the inner and/or outer bands 220, 222, which can create stress concentrations.

Figure 4:
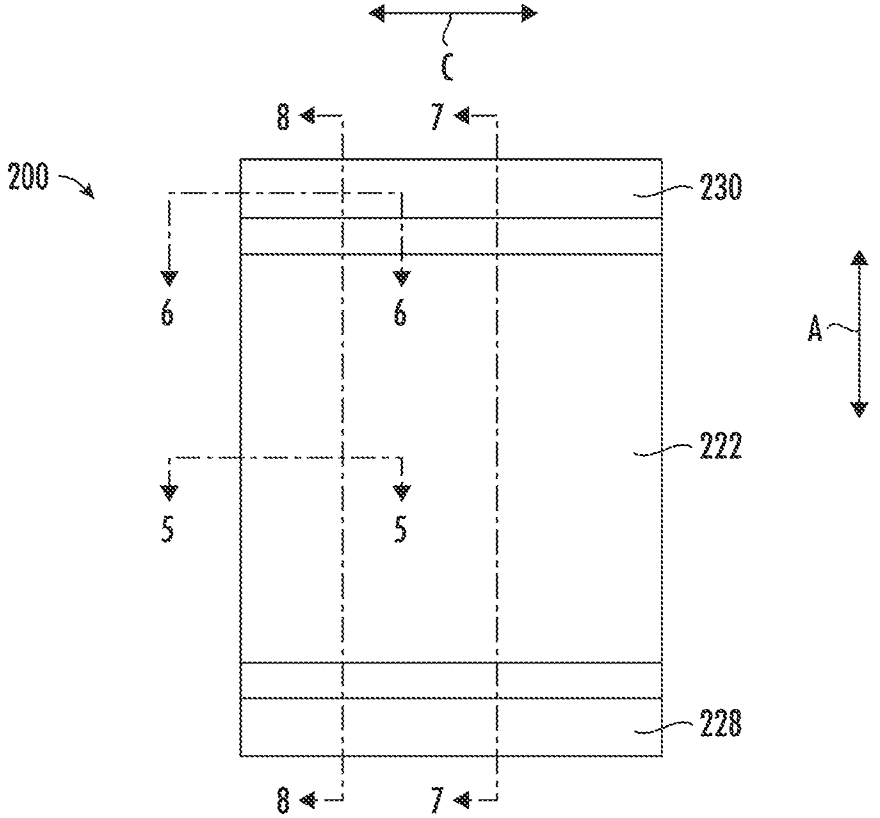
FIG. 4 illustrates a top view of a stator vane for a gas turbine engine in accordance with one or more exemplary aspects of the present disclosure.
Figure 5:
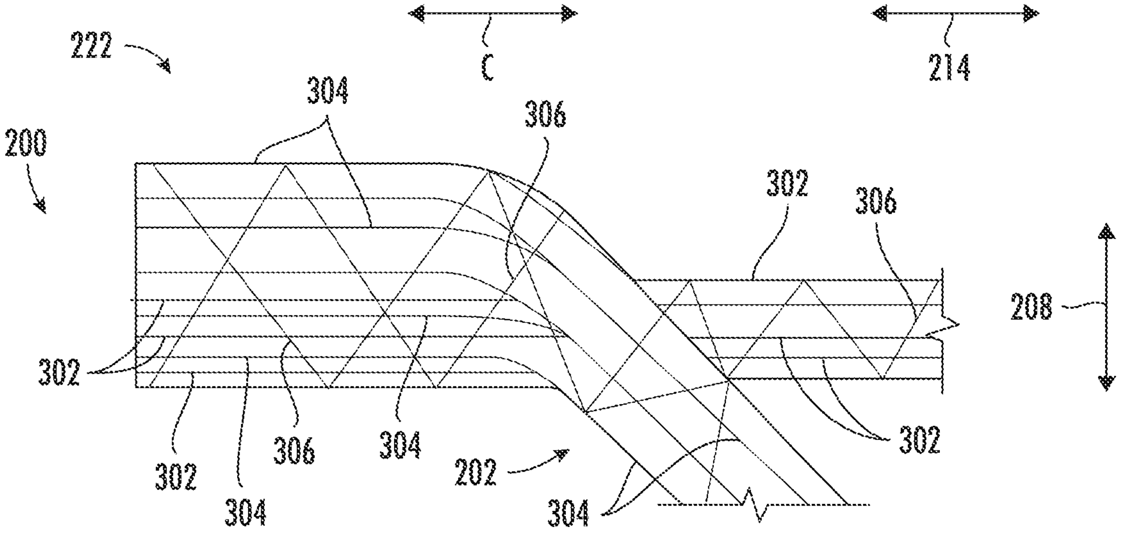
FIG. 5 illustrates a diagrammatic view of the stator vane shown in FIG. 4, particularly illustrating the construction of the stator vane at line 5-5.
Figure 6:
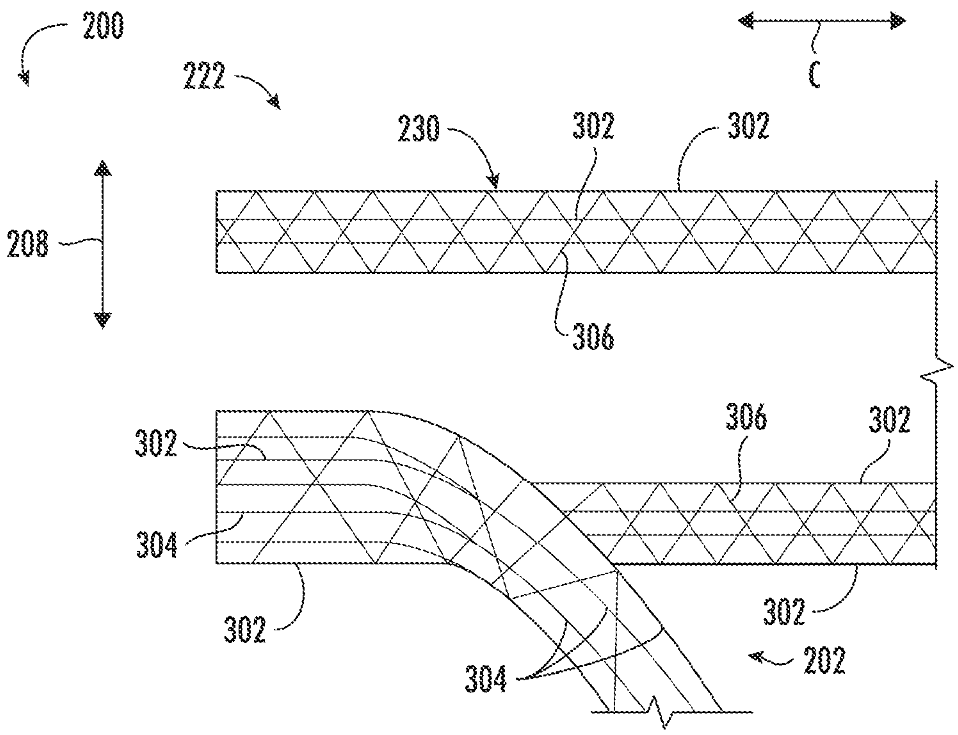
FIG. 6 illustrates a diagrammatic view of the stator vane shown in FIG. 4, particularly illustrating the construction of the stator vane at line 6-6.
Figure 7:
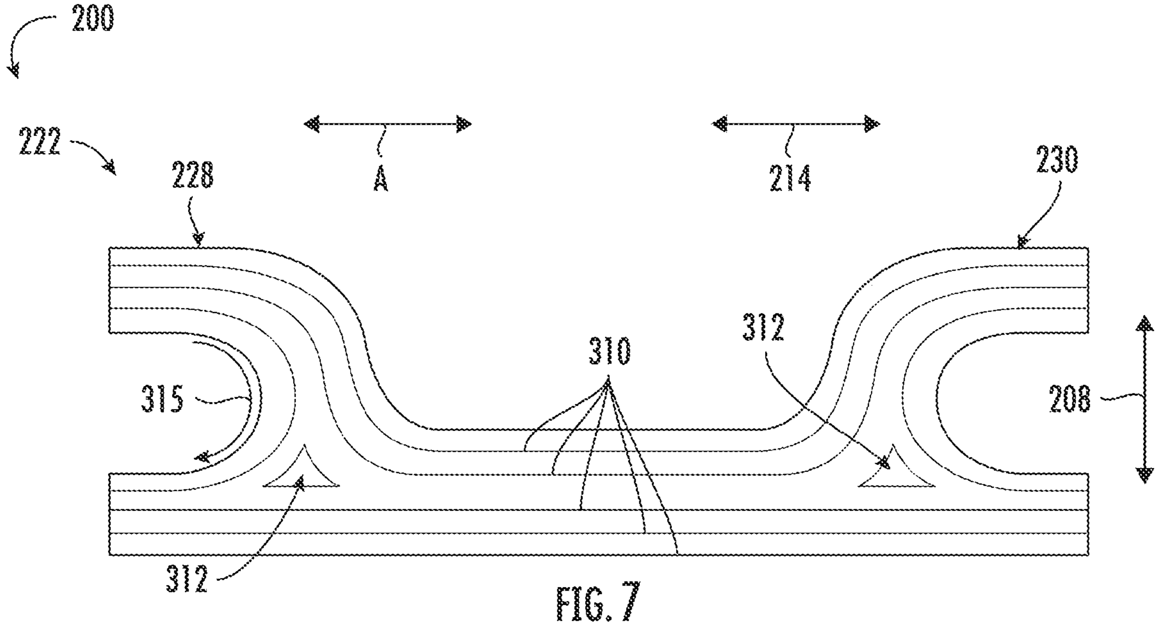
FIG. 7 illustrates a diagrammatic view of the stator vane shown in FIG. 4, particularly illustrating the construction of the outer band at line 7-7, with the airfoil of the stator vane removed for clarity.
Figure 8:
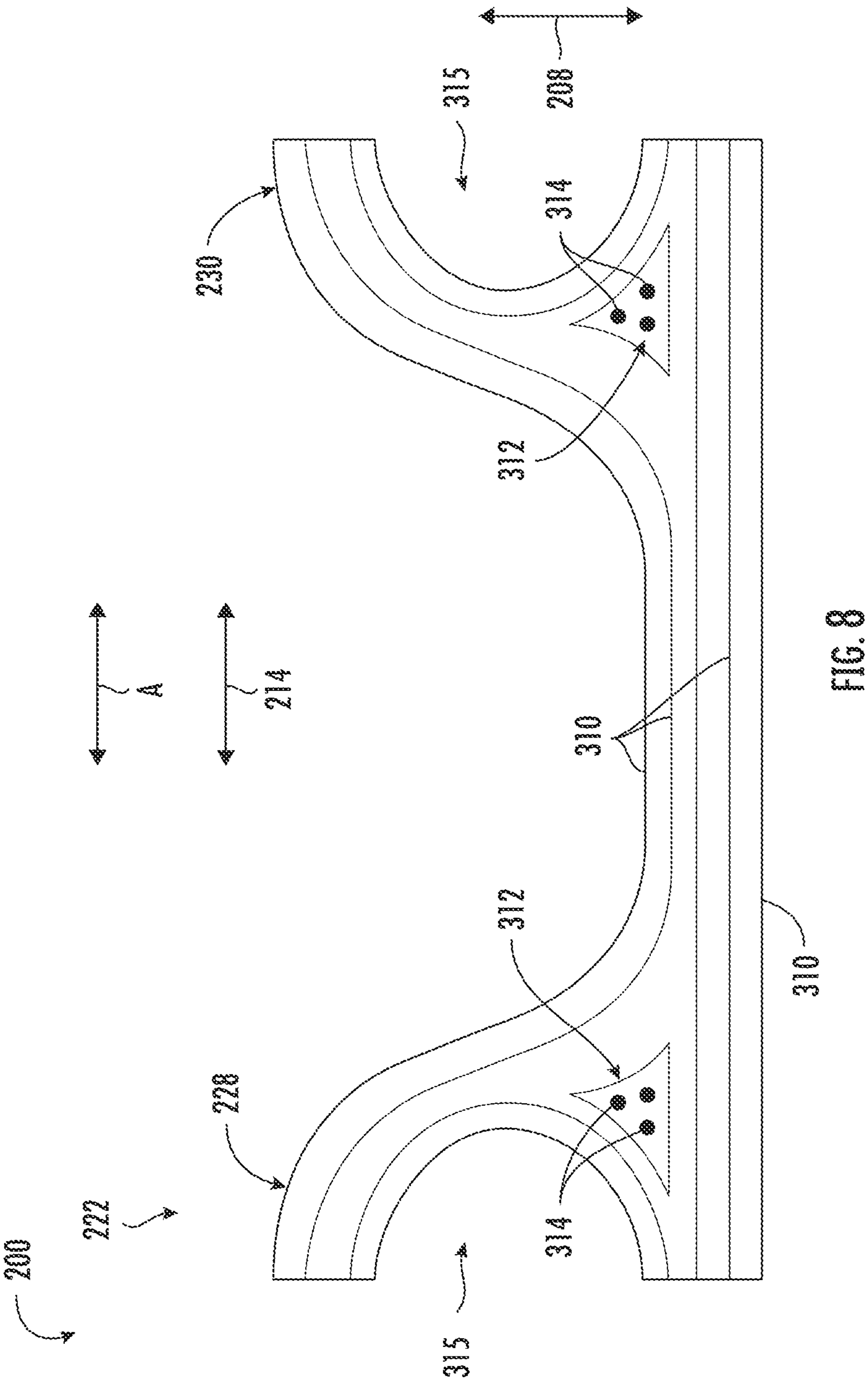
FIG. 8 illustrates a diagrammatic view of the stator vane shown in FIG. 4, particularly illustrating the construction of the outer band at line 8-8, with the airfoil of the stator vane removed for clarity.

FIGS. 4-9 illustrate the construction of the stator vane 200 in accordance with one or more exemplary aspects of the present disclosure. Specifically, FIG. 4 illustrates a top view of the stator vane 200. FIG. 5 illustrates a diagrammatic view of the stator vane 200, particularly illustrating the construction of the stator vane 200 at line 5-5. FIG. 6 illustrates a diagrammatic view of the stator vane 200, particularly illustrating the construction of the stator vane 200 at line 6-6. FIG. 7 illustrates a diagrammatic view of the stator vane 200, particularly illustrating the construction of the stator vane 200 at line 7-7 with the airfoil 202 removed for clarity. FIG. 8 illustrates a diagrammatic view of the stator vane 200, particularly illustrating the construction of the stator vane 200 at line 8-8 with the airfoil 202 removed for clarity.

For purposes of brevity, an exemplary construction of the stator vane 200 and, in particular, the connection of the outer band 222 and the airfoil 202 will be discussed below. However, the connection of the inner band 220 and the airfoil 202 may be formed in the same manner. For example, in some embodiments, only the connection of the outer band 222 and the airfoil 202 may be formed as will be described below, with the inner band 220 being formed as a separate component in a conventional manner. Alternatively, in some embodiments, only the connection of the inner band 220 and the airfoil 202 may be formed as will be described below, with the outer band 222 being formed as a separate component in a conventional manner. In addition, in some embodiments, both of the inner and outer bands 220, 222 may be connected to the airfoil 202 as will be described below.

Figure 9:
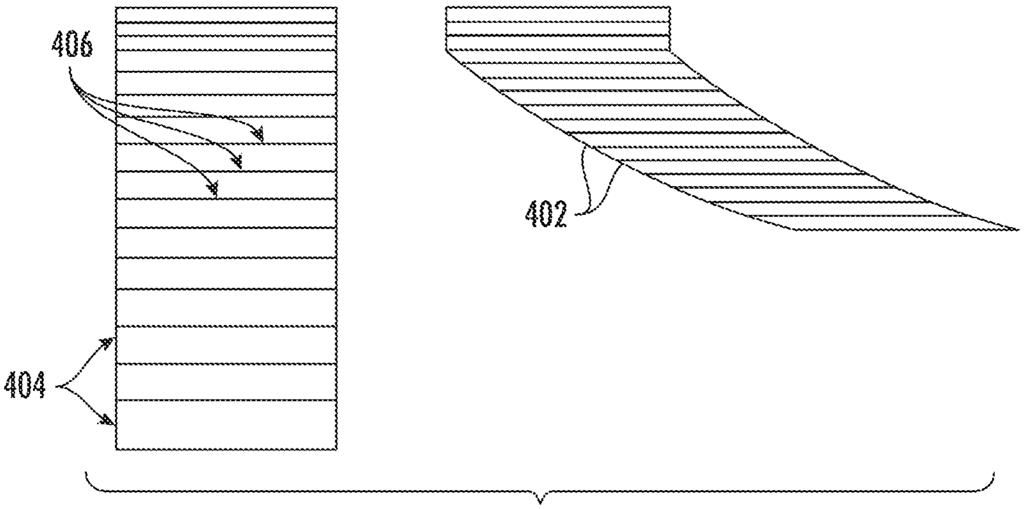
FIG. 9 illustrates a band woven with warp tow columns of variable spacing according to the present disclosure such that shearing and forming can be performed to shift the columns to the desired spacing for the design.

Referring now to FIGS. 5-9, the stator vane 200 is formed of various layers of fibers. More specifically, the outer band 222 includes a plurality of warp fiber tows 302 (FIGS. 5 and 6) extending in the circumferential direction C and a plurality of weft fiber tows 310 (FIGS. 7 and 8) extending in the axial direction A. Initially, the warp fiber tows 302 and the weft fiber tows 310 are oriented generally orthogonally to each other. The warp fiber tows 302 and the weft fiber tows 310 form the hooks 228, 230. Similarly, the airfoil 202 includes a plurality of warp fiber tows 304 (FIGS. 5 and 6) extending in the spanwise direction 208 and a plurality of weft fiber tows (not shown) extending in the chordwise direction 214. Initially, the warp fiber tows 304 and the weft fiber tows of the airfoil 202 are oriented generally orthogonally to each other. In this respect, weaving the final woven preform includes laying the warp fiber tows 302, 310 (e.g., such that the warp fiber tows 302, 310 are held stationary in tension), then laying the weft fiber tows 304 and the weft fiber tows of the airfoil 202 (e.g., such that the weft fiber tows 310 and the weft fiber tows of the airfoil 202 are drawn through and inserted over and under the corresponding warp fibers 302, 304), and repeating this process until the final woven preform is formed. After forming the preform, and as shown in FIG. 9, the shearing of material causes the warp fiber tows 302, 304 and the weft fiber tows 310 of the airfoil 202 to be oriented at an oblique angle. As will be described below, the warp tow column spacing is varied to allow for such shearing.

In some embodiments, the outer band 222 and/or the airfoil 202 include a plurality of Z-weaver fiber tows 306. More specifically, the Z-weaver fiber tows 306 are additional warp fiber tows that are directed through the thickness of the outer band 222 (and/or the inner band 220) and/or the airfoil 202 during weaving to stitch these components together. The Z-weaver fiber tows 306 can be removed for additional formability at an interface of the airfoil 202 and the outer band 222.

Integration of the various portions of the stator vane 200 (e.g., the airfoil 202 with the inner band 220 and/or outer band 222) may be achieved by interweaving fibers together between the respective portions. For example, with particular reference to FIGS. 5 and 6, the interweaving of the airfoil 202 and the outer band 222 is shown. Specifically, as shown, the airfoil 202 and the outer band 222 respectively include the warp fiber tows 302, 304 running parallel with one another within each respective portion. Optionally, the plurality of Z-weaver fiber tows 306 may be directed through the thickness of the warp fiber tows 302, 304 to group and/or stitch together the warp fiber tows 302, 304 and/or other fibers. To integrate the airfoil 202 with the outer band 222, one or more warp fiber tows 304 from the airfoil 202 are brought together with one or more warp fiber tows 302 from the outer band 222 such that the respective warp fiber tows 302, 304 are stacked together in an alternating manner, thereby coupling the outer band 222 and the airfoil 202. This process of stacking in an alternating manner can be repeated for other various portions either individually or in combination. For example, the interwoven section of the airfoil 202 and outer band 222 may further be interwoven with one or more fibers from the hooks 228, 230 on the outer band 222. Alternatively, the hooks 228, 230 may be interwoven with the outer band 222 prior to interweaving the combined hooks 228, 230 and outer band 222 with the airfoil 202.

Moreover, the various fiber tows 302, 304, 310 can be adjusted, shaped, or disposed to produce any requisite portion of the stator vane 200. For example, as shown in FIGS. 7 and 8, the outer band 222 may include the weft fiber tows 310 running in the chordwise direction 214. As such, in some embodiments, one or more of the weft fiber tows 310 may be wrapped around the corners 315 to form and reinforce the corners 315 of one or more of the hooks 228, 230.

Referring still to FIGS. 7 and 8, in some embodiments, one or more portions of the stator vane 200 (FIG. 3) may include a void(s) 312, such as where one or more weft fiber tows 310 are wrapped at the hooks 228, 230. In such embodiments, one or more additional warp fiber tows 314, as shown in FIG. 8, may be inserted into the void(s) 312 to fill the space and add structural integrity. The additional warp fiber tows 314 may, for example, comprise the fiber running orthogonal to the one or more fiber tows that formed the void(s) 312. This may also avoid or decrease the need to add secondary material within the void(s) 312.

As shown in FIG. 9, in some embodiments, the spacing of the warp fiber tows 302 (FIGS. 5 and 6) and/or the weft fiber tows 310 (FIGS. 7 and 8) may be controlled to provide a combination of structural characteristics and component morphology. For example, the warp fiber tows 302 may line up in a vertical plane 402 as the warp fiber tows 302 are woven together, thereby creating a single column 406. During the weaving process, a warp column spacing 404 can be varied freely as needed (e.g., by increasing or decreasing column spacing from aft to forward) to allow for weave shearing to form the stator vane 200. For example, in the embodiment illustrated in FIG. 9, the columns are woven with increasing spacing. The spacing of the columns can be controlled by a loom, operator, or other control mechanism specific to the manufacturing method and equipment. The column spacing 404 can also be used to control formability of preform into final stator vane shape and to control the thickness of the final stator vane shape. For instance, columns are spaced wider in the initial preform than in the final preform. Material is then skewed, tightening column spacing, to form shape and achieve a final desired spacing and a desired fiber volume. Warp and weft column spacing can be used to control fiber volume and therefore final molded part thickness.

Figure 10:
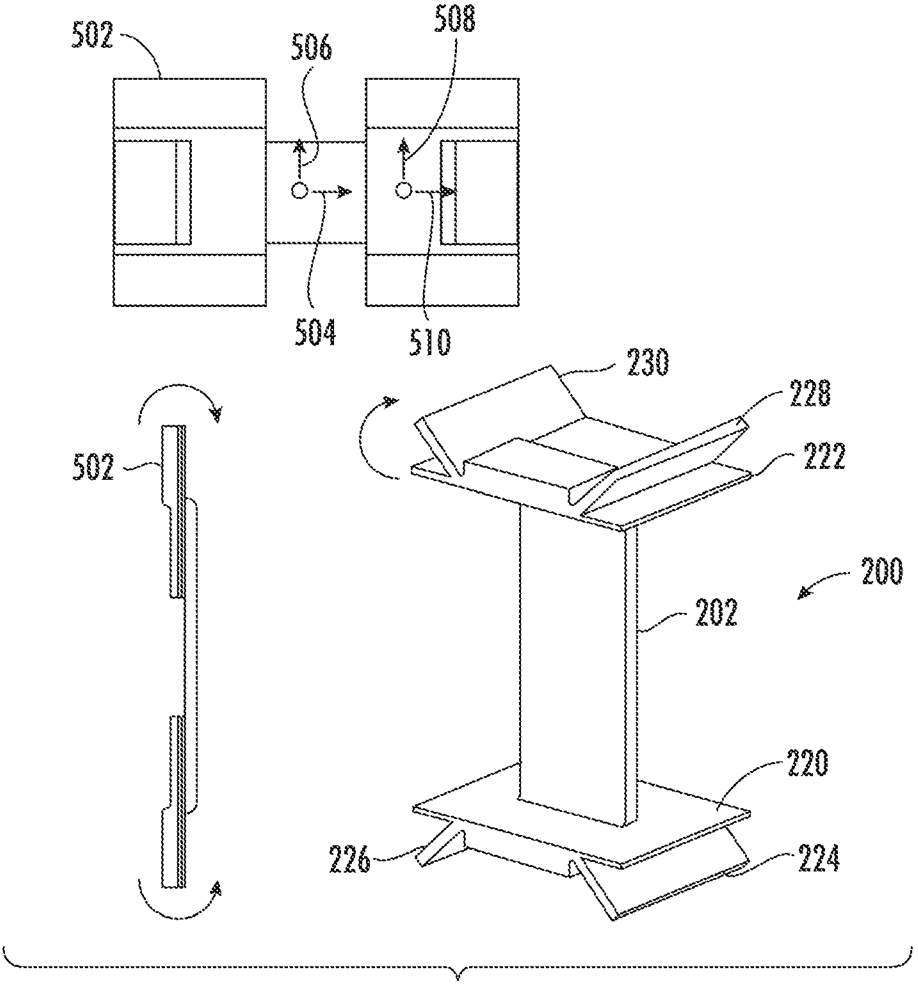
FIG. 10 illustrates a weave and forming diagram of a stator vane for a gas turbine engine according to the present disclosure, particularly illustrating how a woven preform is take from a flat state to a formed state.

FIG. 10 illustrates a flat woven preform 502 woven by a loom and then unfolded to form the stator vane 200. Specifically, as shown, arrow 504 indicates the orientation that warp fiber tows 304 (FIGS. 5 and 6) of the airfoil 202 are oriented when placed on the preform 502. Arrow 506 indicates the orientation that the weft fiber tows (not shown) of the airfoil 202 are oriented when placed on the preform 502, which is orthogonal to the arrow 504. Furthermore, arrow 508 indicates the orientation that the weft fiber tows 310 (FIGS. 5 and 6) of the outer band 222 are oriented when placed on the preform 502. Additionally, arrow 510 indicates the orientation that the warp fiber tows 302 (FIGS. 5 and 6) of the outer band 222 are oriented when placed on the preform 502, which is orthogonal to the arrow 508.

Figure 11:
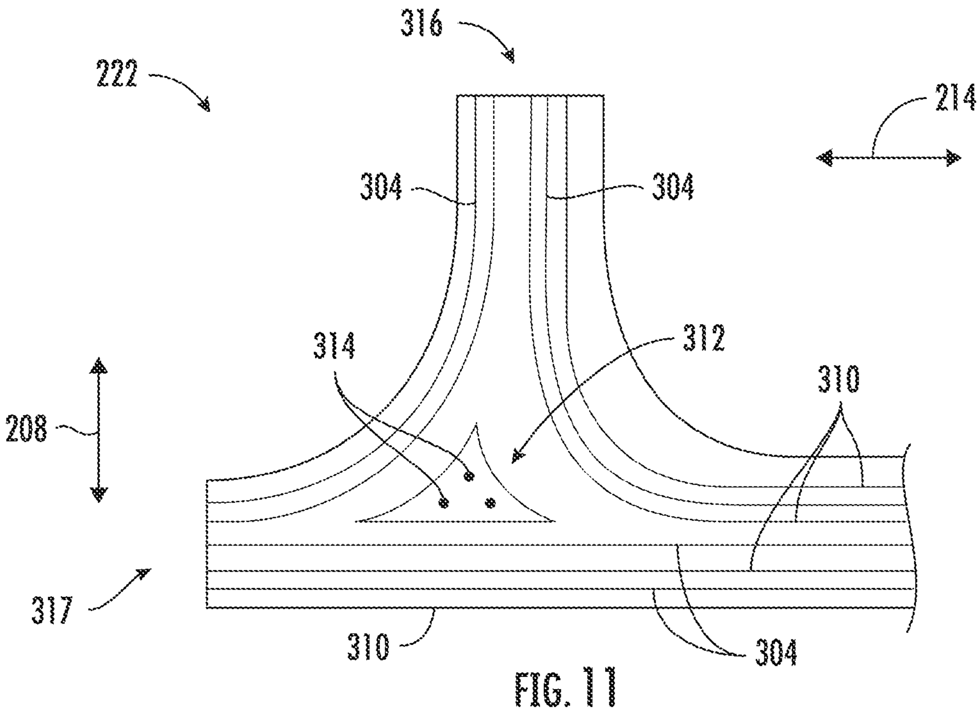
FIG. 11 illustrates a diagrammatic view of an alternative embodiment of an outer band according to the present disclosure, particularly illustrating the construction of a vertical flange feature.

FIG. 11 illustrates a partial diagrammatic view of another embodiment of the outer band 222 of the stator vane 200. Unlike the outer band 222 shown in FIGS. 4-8, the outer band 222 shown in FIG. 11 includes a flange 316 extending outward therefrom in the spanwise direction 208. As shown, the weft fiber tows 310 of the outer band 222 forming the flange 316 are interwoven with the weft fiber tows 304 of the airfoil 202 to form a interwoven portion 317, which forms the flange 316. Alternatively, the flange 316 may be interwoven with the outer band 222 prior to interweaving the combined flange 316 and outer band 222 with the airfoil 202.

Moreover, as mentioned above, the outer band 222 may include the weft fiber tows 310 running in the chordwise direction 214. As such, in some embodiments, one or more of the weft fiber tows 310 may be wrapped around the corners to form and reinforce the flange 316.

In addition, in some embodiments, there may be a void(s) 312 where one or more weft fiber tows 310 are wrapped at the flange 316. In such embodiments, one or more additional warp fiber tows 314 may be inserted into the void(s) 312 to fill the space and add structural integrity. The additional warp fiber tows 314 may, for example, include the fiber running orthogonal to the one or more fiber tows that formed the void(s) 312. This may also avoid or decrease the need to add secondary material within the void(s) 312.

Figure 12:
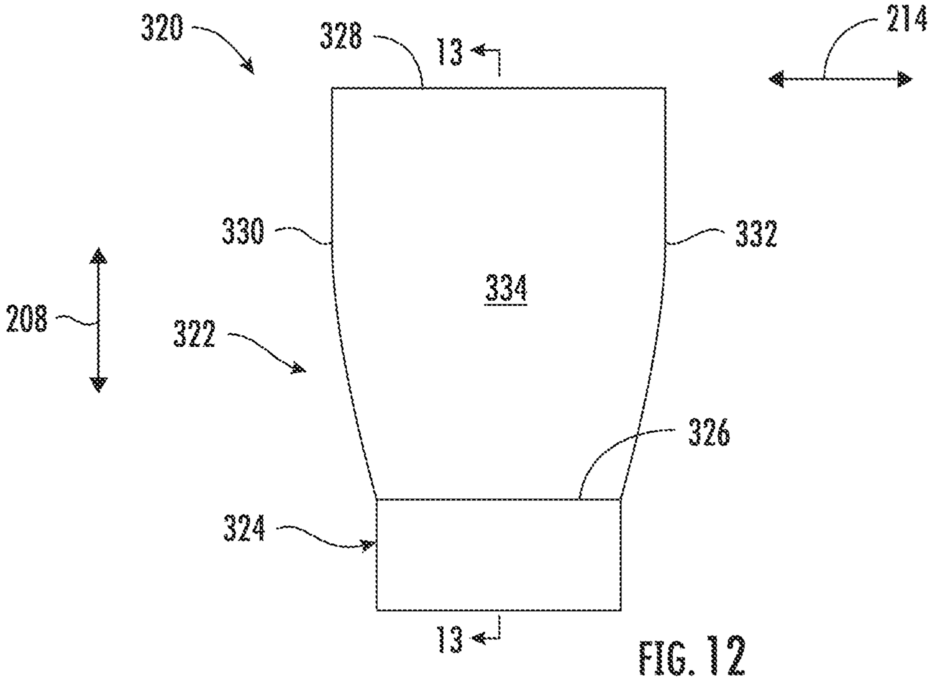
FIG. 12 illustrates a side view of a fan blade for a gas turbine engine according to the present disclosure.

Referring now to FIG. 12, one embodiment of a fan blade 320 is illustrated in accordance with one or more exemplary aspects of the present disclosure. More specifically, the construction of the stator 200 described above can be incorporated into the rotating components of the gas turbine engine 10. As such, the fan blade 320, which is formed using a similar construction to the stator vane 200, may be incorporated into the gas turbine engine 10 in place of any of the fan blades 40 as shown in FIG. 1.

As shown, the fan blade 320 includes an airfoil 322. More specifically, the airfoil 322 includes a pressure side 334 and an opposing, suction side (not shown). Furthermore, the airfoil 322 extends in the spanwise direction 208 from a root 326 to a tip 328. Moreover, the airfoil 322 extends in the chordwise direction 214 from a leading edge 330 and a trailing edge 332. The airfoil 322 is formed from a composite material.

Furthermore, the fan blade 320 includes a dovetail 324 integrally woven to the root 326 of the airfoil 322. The dovetail 324 is formed from a composite material. In this respect, and as will be described below, the dovetail 324 is integrally woven with the airfoil 322. As such, in some embodiments, the fan blade 320 may be constructed using a single piece three dimensional woven preform.

In several embodiments, the fan blade 320 is formed from the composite material 232 shown in FIG. 3. Specifically, as shown in FIG. 3, the composite material 232 includes the plurality of warp fibers 234 running in the spanwise direction 208 and the plurality of weft fibers 236 running in the chordwise direction 214.

Additionally, as mentioned above, the airfoil 322 and the dovetail 324 are integrally formed. More specifically, the warp fibers from the airfoil 202 are folded over and integrated with the warp fibers of the dovetail 324. The warp fibers of the dovetail 324, in turn, run in the circumferential direction C. The warp fibers of the airfoil 322 travel through the thickness of the dovetail 324 to form a strong integration.

Figure 13:
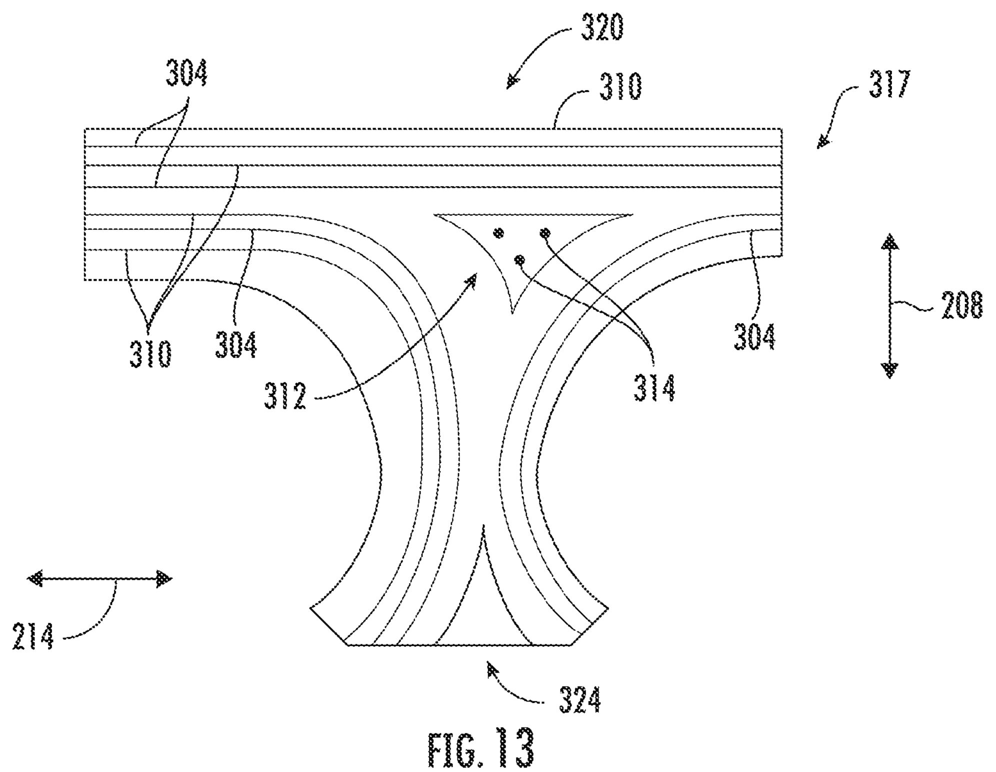
FIG. 13 illustrates a diagrammatic view of an alternative embodiment of an outer band according to the present disclosure, particularly illustrating a dovetail feature.

FIG. 13 illustrates a cross-sectional view of the construction of the dovetail 324 of the fan blade 320 taken about Line 13-13 of FIG. 12. As shown, the dovetail 324 is integrally woven into the fan blade 320. Specifically, in some embodiments, one or more portions of the fan blade 320 may include a void(s) 312, such as where one or more weft fiber tows 310 are wrapped at the dovetail 324. In such embodiments, one or more additional warp fiber tows 314 may be inserted into the void(s) 312 to fill the space and add structural integrity. The additional warp fiber tows 314 may, for example, comprise the fiber running orthogonal to the one or more fiber tows that formed the void(s) 312. This may also avoid or decrease the need to add secondary material within the void(s) 312.

Figure 14:
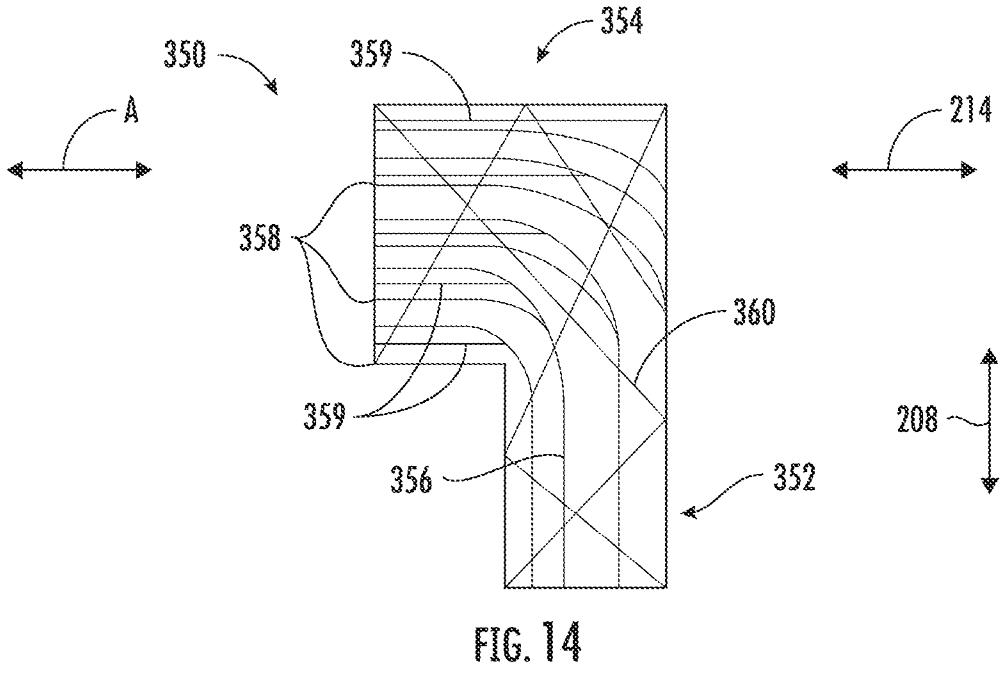
FIG. 14 illustrates a diagrammatic view of a generic composite component for a gas turbine engine according to the present disclosure.

Referring now to FIG. 14, a generic composite component 350 is illustrated in accordance with one or more exemplary aspects of the present disclosure. More specifically, the construction of the stator 200 described above can be incorporated into any component of the gas turbine engine 10. As such, the composite component 350, which is formed using a similar construction to the stator vane 200, may be configured as any of the fan blades 40, 320; the LP compressor stator vanes 70; the HP compressor stator vanes 74; the HP turbine stator vanes 66; the LP turbine stator vanes 62; the stator vane 200; the LP compressor rotor blades 72; the HP compressor rotor blades 76; the HP turbine rotor blades 68; the LP turbine rotor blades 64; and/or any other composite component of the gas turbine engine 10 of FIG. 1.

As shown, the composite component 350 includes a body 352 formed of a composite material. The body 352 may correspond to any suitable portion, such as an airfoil.

Additionally, as shown, the composite component 350 includes a connection feature 354 formed of a composite material. The connection feature 354 may correspond to any suitable portion, such as an inner band, and outer band, a dovetail, a flange, a hook, and/or the like.

As shown, the composite component 350 is formed of various alternating layers of fiber tows integrally woven together. More specifically, the connection feature 354 includes a plurality of warp fiber tows 358 extending in the circumferential direction C (into and out of the page in FIG. 14) and a plurality of weft fiber tows 359 extending in the axial direction A. Initially, the warp fiber tows 358 and the weft fiber tows are oriented generally orthogonally to each other. Similarly, the body 352 includes a plurality of warp fiber tows 356 extending in the spanwise direction 208 and a plurality of weft fiber tows (not shown) extending in the chordwise direction 214. Initially, the warp fiber tows 356 and the weft fiber tows are oriented generally orthogonally to each other. In this respect, weaving the final woven preform includes laying the warp fiber tows 356, 358 (e.g., such that the fiber warp tows 356, 358 are held stationary in tension), then laying the weft fiber tows (e.g., such that the weft fiber tows are drawn through and inserted over and under the corresponding warp fiber tows 356, 358), and repeating this process until the final woven preform is formed. After forming the preform, the shearing of material causes the warp fiber tows 356, 358 and the weft fiber tows to be oriented at an oblique angle.

In some embodiments, the body 352 and/or the connection feature 354 of the composite component 350 include a plurality of Z-weaver fiber tows 360. More specifically, the Z-weaver fiber tows 360 are additional warp fiber tows that are directed through the thickness of the connection feature 354 and/or the body 352 during weaving to stitch these components together. The Z-weaver fiber tows 360 can be removed for additional formability at the interface of the body 352 and the connection feature 354.

Integration of the various portions of the composite component 350 may be achieved by interweaving fibers together between the respective portions. For example, the interweaving of the body 352 and the connection feature 354 is shown in FIG. 14. Specifically, as shown, the body 352 and the connection feature 354 respectively include the warp fiber tows 356, 358 running parallel with one another within each respective portion. Optionally, the plurality of Z-weaver fiber tows 360 may be directed through the thickness of the warp fiber tows 356, 358 to group and/or stitch together the warp fiber tows 356, 358 and/or other fibers. To integrate the body 352 with the connection feature 354, one or more warp fibers 356 from the body 352 are brought together with one or more warp fiber tows 358 from the connection feature 354 such that the respective warp fiber tows 356, 358 are stacked together in an alternating manner, thereby coupling the connection feature 354 and the body 352.

Figure 15:
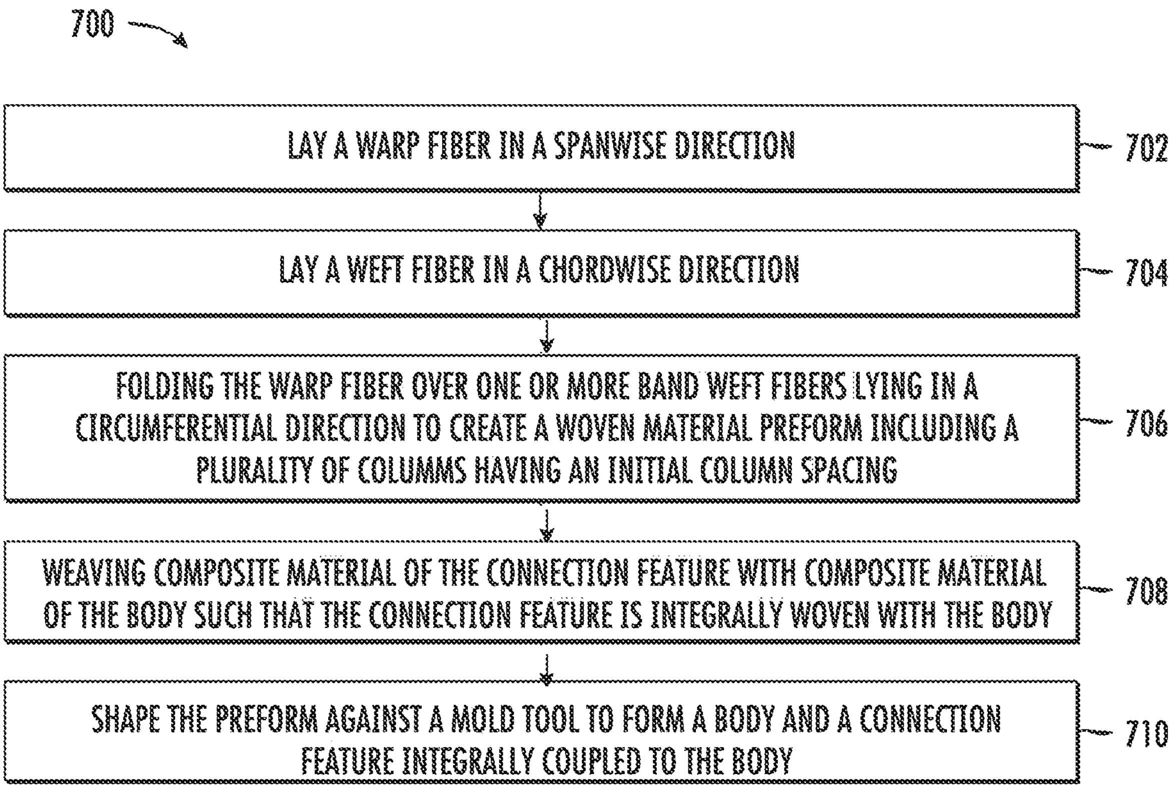
FIG. 15 illustrates a flow diagram of one embodiment of a method for forming a composite component for a gas turbine engine in accordance with one or more exemplary aspects of the present disclosure.

Now referring to FIG. 15, a flow diagram illustrating a method for forming a composite component for a gas turbine engine is provided according to the present disclosure. The method 700 is described herein as implemented using, for example, the composite component 350, which may be any suitable composite component of the gas turbine engine 10. However, it should be appreciated that the disclosed method 700 may be implemented using any other suitable stator vane now known or later developed in the art. In addition, although FIG. 15 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown, at (702), the method 700 includes laying a warp fiber in a spanwise direction 208. For example, as described above, the warp fiber tows 356 may be laid in the spanwise direction 208.

Furthermore, at (704), the method 700 includes laying a weft fiber in a chordwise direction. For example, as described above, the weft fiber tows may be laid in the chordwise direction 214.

Additionally, at (706), the method 700 includes folding the warp fiber over one or more band weft fibers lying in a circumferential direction to create a woven material preform including a plurality of columns having an initial column spacing. For example, as described above with regard to FIG. 14, the warp fiber tows 356 of the body 352 may be folded over one or more of the weft fiber tows 358 of the connection feature 354, which are lying in the circumferential direction C, to create an initial woven material preform having a plurality of columns having an initial column spacing.

Moreover, at (708), the method 700 weaving composite material of the connection feature with composite material of the body such that the connection feature is integrally woven with the body. For example, as described above with regard to FIG. 14, the composite material of the connection feature 354 may be woven with the composite material of the body 352 such that the connection feature 354 is integrally woven with the body 352.

In addition, at (710), the method 700 includes shaping the preform against a mold tool to form a body and a connection feature coupled to the body. For example, as described above with regard to FIG. 14, the preform may be shaped against a mold tool (e.g., by hand) to form the body 352 and the connection feature 354 integrally woven to the body 352.

Some embodiments of the method 700 may include varying a warp fiber spacing in the body 352 and/or the connection feature 354.

Furthermore, some embodiments of the method 700 may include skewing woven material to tighten the final column spacing in the body 352 and/or the connection feature 354.

Additionally, some embodiments of the method 700 may include columns that are spaced wider than a final desired spacing in the woven material preform.

In addition, in some embodiments of the method 700, weaving the composite material of the connection feature 354 with the composite material of the body 352 may include bringing Z-weaver fiber tows 360 out of the body 352 joining the body 352 with the connection feature 354.

Figure 16:
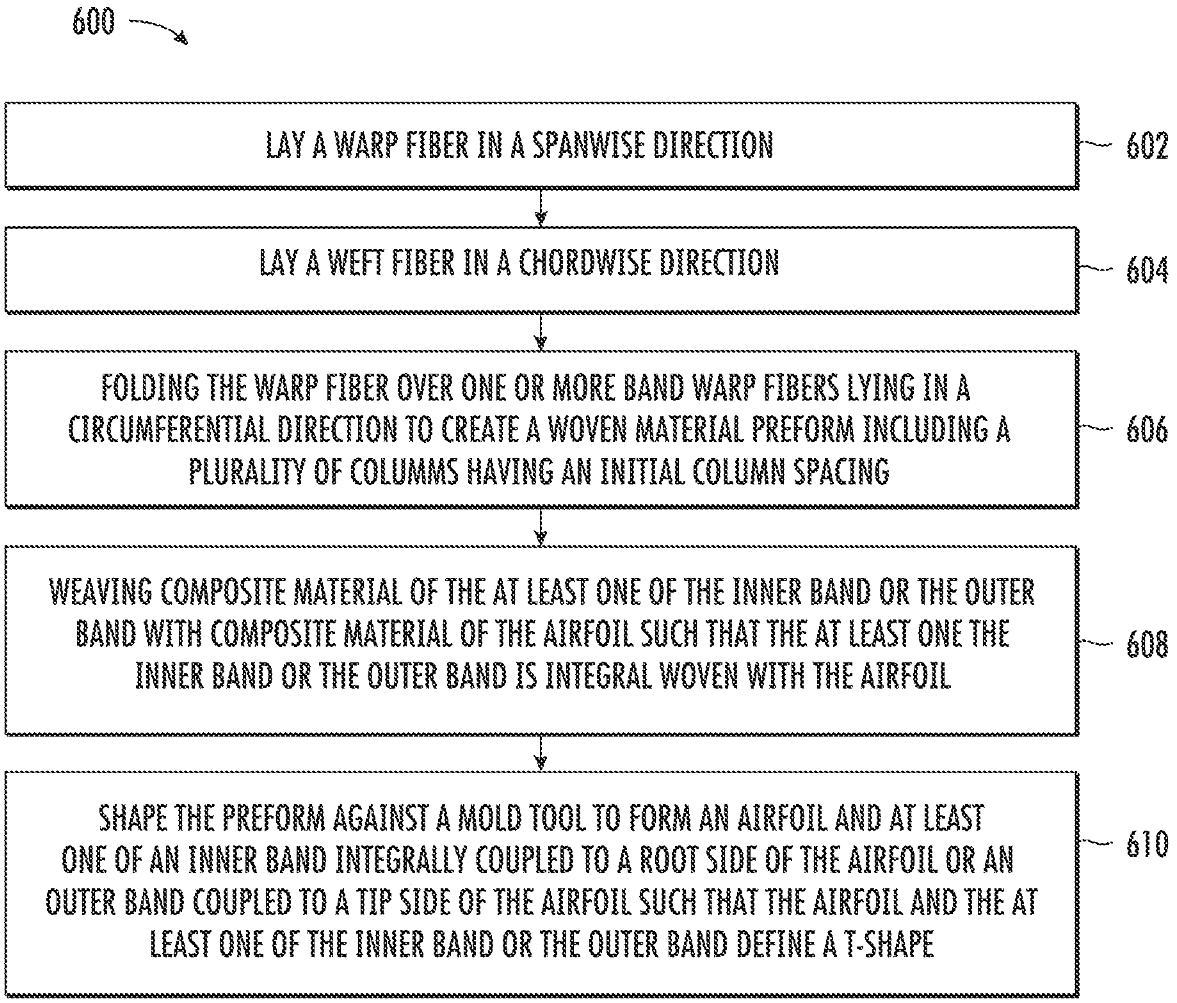
FIG. 16 illustrates a flow diagram of one embodiment of a method for forming a stator vane for a gas turbine engine in accordance with one or more exemplary aspects of the present disclosure.

Now referring to FIG. 16, which illustrates a flow diagram illustrating a method for forming a stator vane for a gas turbine engine according to the present disclosure. The method 600 is described herein as implemented using, for example, the stator vane 200 illustrated in FIGS. 1-10. However, it should be appreciated that the disclosed method 600 may be implemented using any other suitable stator vane now known or later developed in the art. In addition, although FIG. 11 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown, at (602), the method 600 includes laying a warp fiber in a spanwise direction 602. For example, as described above with regard to FIG. 14, the warp fiber tows 304 may be laid in the spanwise direction 208.

Furthermore, at (604), the method 600 includes laying a weft fiber in a chordwise direction. For example, as described above with regard to FIG. 14, the weft fiber tows may be laid in the chordwise direction 214.

Additionally, at (606), the method 600 includes folding the warp fiber over one or more band warp fibers lying in a circumferential direction to create a woven material preform including a plurality of columns having an initial column spacing. For example, as described above, the warp fiber tows 304 of the airfoil 202 may be folded over one or more of the warp fiber tows 302 of the outer band 222, which are lying in the circumferential direction C, to create an initial woven material preform having a plurality of columns having an initial column spacing.

Moreover, at (608), the method 600 includes weaving composite material of the at least one of the inner band or the outer band with composite material of the airfoil such that the at least one the inner band or the outer band is integral woven with the airfoil. For example, as described above, the composite material of the inner band 220 and/or the outer band 222 may be woven with the composite material of the airfoil 202 such that the inner band 220 and/or the outer band 222 is integrally woven with the airfoil 202.

In addition, at (610), the method 600 includes shaping the preform against a mold tool to form an airfoil and at least one of an inner band integrally woven to a root of the airfoil or an outer band coupled to a tip of the airfoil such that the airfoil and the at least one of the inner band or the outer band define a T-shape. For example, as described above, the preform may be shaped, e.g., by hand, against a mold tool to form the airfoil 202 and the inner band 220 integrally woven to the root 210 of the airfoil 202 and/or the outer band 222 coupled to the tip 212 of the airfoil 202 such that the airfoil 202 and the inner band 220 and/or the outer band 222 define a T-shape(s).

Some embodiments of the method 600 may include varying a warp fiber spacing in the airfoil 202, the inner band 220, and/or the outer band 222.

Furthermore, some embodiments of the method 600 may include skewing woven material to tighten the final column spacing in the airfoil 202, the inner band 220, and/or the outer band 222.

Additionally, some embodiments of the method 600 may include columns that are spaced wider than a final desired spacing in the woven material preform.

Moreover, in some embodiments of the method 600, forming the inner band 220 and/or the outer band 222 may include forming the integrally woven forward hooks 224, 228 positioned axially inboard of a leading edge 216 of the airfoil 202 and/or an integrally woven aft hooks 226, 230 positioned axially inboard of a trailing edge 218 of the airfoil 202.

In addition, in some embodiments of the method 600, weaving the composite material of the inner band 220 and/or the outer band 222 with the composite material of the airfoil 202 may include bringing Z-weaver fiber tows 306 out of the airfoil 202 joining the airfoil 202 with the inner band 220 and/or the outer band 222.

Integrally woven construction of the composite component improves the performance and manufacturing process of the composite component. More specifically, the integral weaving of the body and the connection feature(s) (e.g., airfoil with the inner and/or outer bands) reduces the weight of the composite component (e.g., the stator vane), thereby reducing overall engine weight and improving fuel economy. Furthermore, the connection between the body and the connection feature(s) is strengthened. For example, the integral weaving of the hook(s) with the inner and/or outer band strengthens the hook(s) and distributes stress away from the edges of the inner and/or outer bands, thereby improving engine service life. Additionally, because the composite component is formed from a single woven preform, the complex and time-consuming process of combining multiple preforms is not needed.

Further aspects are provided by the subject matter of the following clauses:

A composite component for a gas turbine engine, the composite component comprising: a body comprising composite material; and a connection feature integrally woven to the body, the connection portion comprising a composite material, wherein the composite material of the body and the composite material of the connection feature comprise alternating layers of fiber tows integrally woven together.

The composite component of the preceding clause, wherein the connection feature comprises a band integrally woven with the body.

The composite component of any preceding clause, wherein the connection feature comprises an integrally woven hook.

The composite component of any preceding clause, wherein the integrally woven hook is positioned axially inboard of the leading edge of the body and axially inboard of the trailing edge of the body.

The composite component of any preceding clause, wherein the connection feature comprises a dovetail integrally woven with the body.

The composite component of any preceding clause, wherein the connection feature comprises a flange integrally woven with the body.

The composite component of any preceding clause, wherein the body comprises a warp fiber oriented in a spanwise direction of the gas turbine engine.

The composite component of any preceding clause, wherein the connection portion comprises a warp fiber oriented in a circumferential direction of the gas turbine engine.

The composite component of any preceding clause, wherein the body and the connection feature comprise a z-weaver fiber directed through a thickness of the body and the connection feature.

The composite component of any preceding clause, wherein the connection feature comprises a weft fiber oriented orthogonally to a warp fiber.

The composite component of any preceding clause, wherein the weft fiber of the connection feature is wrapped around to reinforce a corner of the connection feature.

The composite component of any preceding clause, wherein additional warp fiber tows are added to a void defined by the connection feature to fill the void.

The composite component of any preceding clause, wherein the body comprises and airfoil and the connection feature comprises a dovetail.

The composite component of any preceding clause, wherein the body comprises and airfoil and the connection feature comprises a flange.

A gas turbine engine, comprising: at least one of: a fan section; a compressor section; or a turbine section; and a composite component positioned within one of the fan section, the compressor section, or turbine section, the composite component comprising: a body comprising composite material; and a connection feature integrally woven to the body, the connection portion comprising a composite material, wherein the composite material of the body and the composite material of the connection feature comprise alternating layers of fiber tows integrally woven together.

The gas turbine engine of any preceding clause, wherein the connection feature comprises a band integrally woven with the body.

The gas turbine engine of any preceding clause, wherein the connection feature comprises an integrally woven hook.

The gas turbine engine of any preceding clause, wherein the integrally woven hook is positioned axially inboard of the leading edge of the body and axially inboard of the trailing edge of the body.

The gas turbine engine of any preceding clause, wherein the connection feature comprises a dovetail integrally woven with the body.

The gas turbine engine of any preceding clause, wherein the connection feature comprises a flange integrally woven with the body.

The gas turbine engine of any preceding clause, wherein the body comprises a warp fiber oriented in a spanwise direction of the composite component.

The gas turbine engine of any preceding clause, wherein the connection portion comprises a warp fiber oriented in a circumferential direction of the composite component.

The gas turbine engine of any preceding clause, wherein the body and the connection feature comprise a z-weaver fiber directed through a thickness of at least one of the body or the connection feature.

The gas turbine engine of any preceding clause, wherein the connection feature comprises a weft fiber oriented orthogonally to a warp fiber.

The gas turbine engine of any preceding clause, wherein the weft fiber of the connection feature is wrapped around to reinforce a corner of the connection feature.

The gas turbine engine of any preceding clause, wherein additional warp fiber tows are added to a void defined by the connection feature to fill the void.

The gas turbine engine of any preceding clause, wherein the body comprises and airfoil and the connection feature comprises a dovetail.

The gas turbine engine of any preceding clause, wherein the body comprises and airfoil and the connection feature comprises a flange.

A stator vane for a gas turbine engine, the stator vane comprising: an airfoil extending in a spanwise direction between a root of the airfoil and a tip of the airfoil, the airfoil further extending in a chordwise direction between a leading edge of the airfoil and a trailing edge of the airfoil, the airfoil comprising a composite material; and at least one of an inner band integrally woven to the root of the airfoil or an outer band integrally woven to the tip of the airfoil, the at least one of the inner band or the outer band comprising a composite material, wherein the composite material of the airfoil and the composite material of the at least one of the inner band or the outer band are integrally woven together to define a T-shape.

The stator vane of any preceding clause, wherein the at least one of the inner band or the outer band comprises at least one of an integrally woven forward hook or an integrally woven aft hook.

The stator vane of any preceding clause, wherein the at least one of the integrally woven forward hook or the integrally woven aft hook is positioned axially inboard of the leading edge of the airfoil and axially inboard of the trailing edge of the airfoil.

The stator vane of any preceding clause, wherein the airfoil comprises a warp fiber oriented in a spanwise direction.

The stator vane of any preceding clause, wherein the at least one of the inner band and the outer band comprises a warp fiber oriented in a circumferential direction.

The stator vane of any preceding clause, wherein the airfoil and the at least one of the inner band or the outer band comprises a z-weaver fiber directed through a thickness of at least one of the airfoil or the at least one of the inner band or the outer band.

The stator vane of any preceding clause, wherein the at least one of the inner band or the outer band comprise a weft fiber oriented orthogonally to a warp fiber.

The stator vane of any preceding clause, wherein the weft fiber of the at least one of the inner band or the outer band is wrapped around to reinforce a corner of an integrally woven forward hook or an integrally woven aft hook.

The stator vane of any preceding clause, wherein additional warp fiber tows are added to a void defined by the at least one the inner band or the outer band to fill the void.

A gas turbine engine, comprising: at least one of: a compressor section; or turbine section; and a stator vane positioned within the at least one of the compressor section or turbine section, the stator vane comprising: an airfoil extending in a spanwise direction between a root of the airfoil and a tip of the airfoil, the airfoil further extending in a chordwise direction between a leading edge of the airfoil and a trailing edge of the airfoil, the airfoil comprising a composite material; and at least one of an inner band integrally woven to the root of the airfoil or an outer band integrally woven to the tip of the airfoil, the at least one of the inner band or the outer band including an integrally woven hook, the at least one of the inner band or the outer band comprising a composite material, the composite material of the airfoil and the composite material of the at least one of the inner band or the outer band are integrally woven together to define a T-shape, the at least one of the inner band or the outer band including at least one of an integrally woven forward hook or an integrally woven aft hook.

The gas turbine engine of any preceding clause, wherein the at least one of the integrally woven forward hook or the integrally woven aft hook is positioned axially inboard of the leading edge of the airfoil and axially inboard of the trailing edge of the airfoil.

The gas turbine engine of any preceding clause, wherein the airfoil comprises a warp fiber oriented in a spanwise direction.

The gas turbine engine of any preceding clause, wherein the at least one of the inner band and the outer band comprises a warp fiber oriented in a circumferential direction.

The gas turbine engine of any preceding clause, wherein the airfoil and the at least one of the inner band or the outer band comprises a z-weaver fiber directed through a thickness of at least one of the airfoil or the at least one of the inner band or the outer band.

A fan blade for a gas turbine engine, the fan blade comprising: an airfoil extending in a spanwise direction between a root of the airfoil and a tip of the airfoil, the airfoil further extending in a chordwise direction between a leading edge of the airfoil and a trailing edge of the airfoil, the airfoil comprising a composite material; and dovetail integrally woven to the root of the airfoil, the dovetail comprising a composite material, wherein the composite material of the airfoil and the composite material of the dovetail are integrally woven together.

The fan blade of any preceding clause, wherein the airfoil comprises a warp fiber oriented in a spanwise direction.

The fan blade of any preceding clause, wherein the dovetail comprises a warp fiber oriented in a circumferential direction.

The fan blade of any preceding clause, wherein the airfoil and the dovetail comprises a z-weaver fiber directed through a thickness of at least one of the airfoil or the dovetail.

The fan blade of any preceding clause, wherein the dovetail comprise a weft fiber oriented orthogonally to a warp fiber.

The fan blade of any preceding clause, wherein the weft fiber of the dovetail is wrapped around to reinforce a corner of the dovetail.

The fan blade of any preceding clause, wherein additional warp fiber tows are added to a void defined by the dovetail to fill the void.

A gas turbine engine, comprising: a fan section; and a fan blade positioned within the fan section, the fan blade comprising: an airfoil extending in a spanwise direction between a root of the airfoil and a tip of the airfoil, the airfoil further extending in a chordwise direction between a leading edge of the airfoil and a trailing edge of the airfoil, the airfoil comprising a composite material; and dovetail integrally woven to the root of the airfoil, the dovetail including an integrally woven hook, the dovetail comprising a composite material, the composite material of the airfoil and the composite material of the dovetail are integrally woven together.

The gas turbine engine of any preceding clause, wherein the airfoil comprises a warp fiber oriented in a spanwise direction.

The gas turbine engine of any preceding clause, wherein the dovetail comprises a warp fiber oriented in a circumferential direction.

The gas turbine engine of any preceding clause, wherein the airfoil and the dovetail comprises a z-weaver fiber directed through a thickness of at least one of the airfoil or the dovetail.

A method of forming a composite component for a gas turbine engine, the method comprising: laying a warp fiber in a spanwise direction; laying a weft fiber in a chordwise direction; folding the warp fiber over one or more band warp fibers lying in a circumferential direction to create a woven material preform including a plurality of columns having an initial column spacing; and shaping the preform by hand against a mold tool to form a body and connection feature integrally woven to the body; and weaving composite material of the connection feature with composite material of the body such that the connection feature is integrally woven with the body.

The method of any preceding clause, further comprising: varying a warp fiber spacing in at least one of the body or the connection feature.

The method of any preceding clause, further comprising: skewing the woven material to tighten the final column spacing of at least one of the body or the connection feature.

The method of any preceding clause, wherein the initial column spacing is wider than a final spacing in the woven material preform.

The method of any preceding clause, further comprising: forming connection feature comprises forming an integrally woven forward hook positioned axially inboard of a leading edge of the body or an integrally woven aft hook positioned axially inboard of a trailing edge of the body.

The method of any preceding clause, wherein weaving the composite material of the connection feature with the composite material of the body comprises bringing Z-weavers out of the body joining the body with the at least one of the connection feature.

A method of forming a stator vane for a gas turbine engine, the method comprising: laying a warp fiber in a spanwise direction; laying a weft fiber in a chordwise direction; folding the warp fiber over one or more band warp fibers lying in a circumferential direction to create a woven material preform including a plurality of columns having an initial column spacing; and shaping the preform by hand against a mold tool to form an airfoil and at least one of an inner band integrally woven to a root of the airfoil or an outer band coupled to a tip of the airfoil such that the airfoil and the at least one of the inner band or the outer band define a T-shape; and weaving composite material of the at least one of the inner band or the outer band with composite material of the airfoil such that the at least one the inner band or the outer band is integrally woven with the airfoil.

The method of any preceding clause, further comprising: varying a warp fiber spacing in at least one of the airfoil or the at least one of the inner band or the outer band.

The method of any preceding clause, further comprising: skewing the woven material to tighten the final column spacing of at least one of the airfoil body or the at least one of the inner band or the outer band.

The method of any preceding clause, wherein the initial column spacing is wider than a final spacing in the woven material preform.

The method of any preceding clause, further comprising: forming at least one of the inner band or the outer band comprises forming an integrally woven forward hook positioned axially inboard of a leading edge of the airfoil or an integrally woven aft hook positioned axially inboard of a trailing edge of the airfoil.

The method of any preceding clause, wherein weaving the composite material of the at least one of the inner band or the outer band with the composite material of the airfoil comprises bringing Z-weavers out of the airfoil joining the airfoil with the at least one of the inner band or the outer band.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A composite component for a gas turbine engine, the composite component comprising:

a body comprising a composite material formed from a first plurality of weft fiber tows and a first plurality of warp fiber tows including a first portion of warp fiber tows;

a connection feature integrally woven to the body, the connection feature comprising a composite material formed from a second plurality of weft fiber tows and a second plurality of warp fiber tows including the first portion of warp fiber tows; and a plurality of Z-weaver fiber tows that form at least a portion of the body and the connection feature, the Z-weaver fiber tows extending through a thickness of the connection feature and through a thickness of the body;

wherein the first portion of warp fiber tows extend in a first direction within the body and in a second direction within the connection feature different than the first direction, and the Z-weaver fiber tows extend in a third direction different than the first direction and different than the second direction; and wherein the composite material of the body and the composite material of the connection feature comprise alternating layers of fiber tows integrally woven together.

2. The composite component of claim 1, wherein the connection feature comprises a band integrally woven with the body.

3. The composite component of claim 2, wherein the connection feature comprises an integrally woven hook integrally woven with the band.

4. The composite component of claim 3, wherein the integrally woven hook is positioned axially inboard of a leading edge of the body and axially inboard of a trailing edge of the body.

5. The composite component of claim 1, wherein the connection feature comprises a dovetail integrally woven with the body.

6. The composite component of claim 1, wherein the connection feature comprises a flange integrally woven with the body.

7. The composite component of claim 1, wherein the first direction is a spanwise direction of the composite component.

8. The composite component of claim 7, wherein the second direction is a circumferential direction of the composite component.

9. The composite component of claim 1, wherein the second plurality of weft fiber tows is oriented orthogonally to the second plurality of warp fiber tows.

10. The composite component of claim 9, wherein the connection feature comprises a corner and the second plurality of weft fiber tows is wrapped around the corner to form a reinforced corner of the connection feature.

11. The composite component of claim 10, wherein additional warp fiber tows are added to a void defined by the connection feature to fill the void.

12. The composite component of claim 1, wherein the body comprises an airfoil and the connection feature comprises a dovetail.

13. The composite component of claim 1, wherein the body comprises an airfoil and the connection feature comprises a flange.

14. The composite component of claim 1, further comprising:

variable warp column spacing to achieve formation of the composite component.

15. The composite component of claim 1, wherein the first plurality of weft fiber tows and the first plurality of warp fiber tows are oriented at an oblique angle with respect to each other and the second plurality of weft fiber tows and the second plurality of warp fiber tows are also oriented at an oblique angle with respect to each other.

16. A gas turbine engine, comprising:

at least one of:

a fan section;

a compressor section; or a turbine section; and a composite component positioned within one of the fan section, the compressor section, or turbine section, the composite component comprising:

a body comprising a composite material formed from a first plurality of weft fiber tows and a first plurality of warp fiber tows including a first portion of warp fiber tows;

a connection feature integrally woven to the body, the connection feature comprising a composite material formed from a second plurality of weft fiber tows and a second plurality of warp fiber tows including the first portion warp fiber tows; and a plurality of Z-weaver fiber tows that form at least a portion of the body and the connection feature, the Z-weaver fiber tows extending through a thickness of the connection feature and through a thickness of the body;

wherein the first portion of warp fiber tows extend in a first direction within the body and in a second direction within the connection feature different than the first direction, and the Z-weaver fiber tows extend in a third direction different than the first direction and different than the second direction; and wherein the composite material of the body and the composite material of the connection feature comprise alternating layers of fiber tows integrally woven together.

17. The gas turbine engine of claim 16, wherein the first direction is a spanwise direction of the gas turbine engine.

18. The gas turbine engine of claim 17, wherein the second direction is a circumferential direction of the gas turbine engine.

19. The gas turbine engine of claim 16, wherein the second plurality of weft fibers tows is oriented orthogonally to the second plurality of warp fiber tows.

20. The gas turbine engine of claim 16, wherein the first plurality of weft fiber tows and the first plurality of warp fiber tows are oriented at an oblique angle with respect to each other and the second plurality of weft fiber tows and the second plurality of warp fiber tows are also oriented at an oblique angle with respect to each other.

* * * * *